I. WILLITS.

No. 93,028.

Wagon Brake.

Patented July 27, 1869.

United States Patent Office.

IRVIN WILLITS, OF DEER PLAIN, ILLINOIS.

Letters Patent No. 93,028, dated July 27, 1869.

IMPROVED WAGON-BRAKE.

The Schedule referred to in these Letters Patent and making part of the same.

To all whom it may concern:

Be it known that I, IRVIN WILLITS, of Deer Plain, in the county of Calhoun, and State of Illinois, have invented a new and improved Automatic Wagon-Brake; and I do hereby declare that the following is a clear and exact description thereof, which will enable others skilled in the art to make and use the same, reference being had to the accompanying drawings, forming a part of this specification.

This invention relates to improvements in wagon-brakes, designed to provide an improved and reliable self-acting brake, to be thrown out of action by the forward movement of the bolt which engages the double-tree to the tongue, as the animals begin to draw, and to fall into action by its own weight, and the traction of the wheels, whenever the draught ceases, while the vehicle is in forward motion, which takes place when the descent of the road is such that the animals are reined into a holding-back position, all as hereinafter more fully specified.

Figure 1:
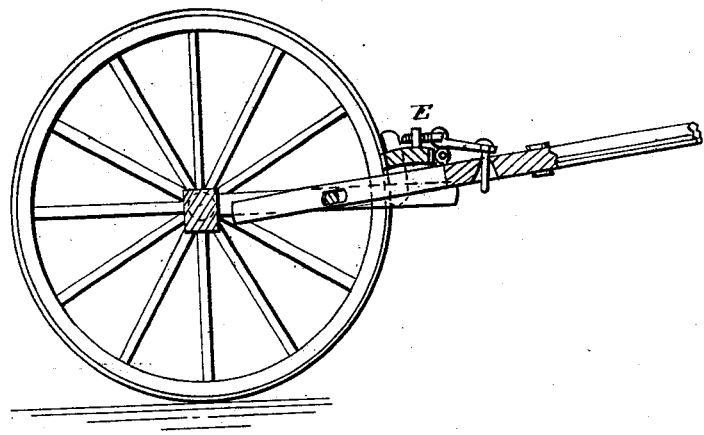
Figure 2:
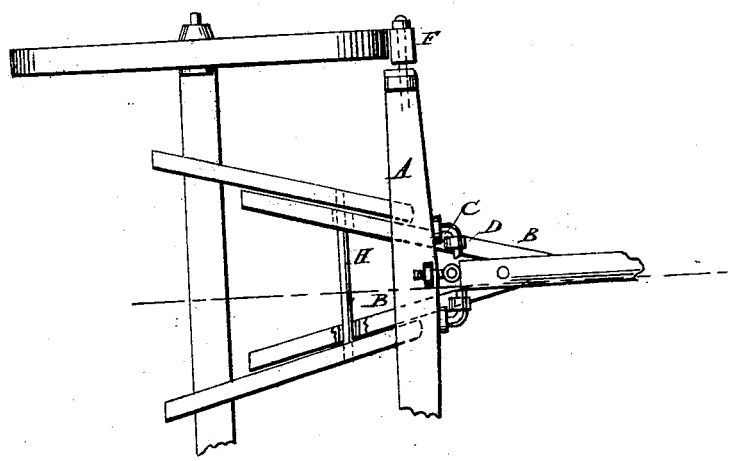

Figure 1 represents sectional elevation of the fore part of a wagon, provided with my improved brake; and Figure 2 represents a plan view of the same.

Similar letters of reference indicate corresponding parts.

A represents a brake-bar, hinged to the hounds B of the tongue, by the adjustable bent bolts C, taking into the eye-bolts D, rising vertically from the hounds.

The said bar is provided with brake-shoes E, journalled at each end, to bear upon the faces of the front wheels.

It is designed to be so shaped and adjusted as to height, that the said shoes will bear upon the wheels in the horizontal plane of the axis of the wheels.

The said bar is provided with a link, F, adjustably connected thereto, and arranged to be connected to the double-tree bolt, which I propose to extend above the top of the double-tree, so that it will have a to-and-fro motion sufficient to move the brake out of action, or allow it to fall into action, as the traces are slackened or tightened, under the changes which occur when the animals change from a drawing to a holding-back action, or vice versa; and to increase the movement of the said bolt, I elongate the hole in the tongue for the said bolt, so that it will vibrate as the animals draw, or the brake falls into action.

By this arrangement, it will be seen that a very reliable brake is provided, which will always be brought into action when the animals cease to draw, and hold back sufficiently to allow the traces to slacken.

Also, that by the provision made for the adjustment of several of the parts, it can be used to great advantage.

The arrangement of the brake-bar is such that it may rest on the ends of the hounds of the axle, when the brakes are resting on the wheels, so that the action of the brake shall cause no pressure upon the necks of the animals, and also lessen the strain upon the hinges.

Having thus described my invention,

What I claim as new, and desire to secure by Letters Patent, is—

The brake-bar A, carrying the pivoted shoes F, hinged at its forward edge to the upper side of the tongue, and attached to the loose double-tree bolt by means of the adjustable link E, whereby, when the draught of the team ceases, the brake-bar falls, by its own gravity, to carry the shoes F against the periphery of the forward wheels, substantially as described, for the purpose specified.

IRVIN WILLITS.

Witnesses:
   THOS. M. HARDY,
   S. M. WILLITS.